US005590147A

United States Patent [19]
Hobbs et al.

[11] Patent Number: 5,590,147
[45] Date of Patent: Dec. 31, 1996

[54] SIDE-PUMPED LASERS

[75] Inventors: John W. Hobbs, Somerset; Laurence E. Cramer, Flemington, both of N.J.

[73] Assignee: The Morgan Curcible Company plc, Windsor, United Kingdom

[21] Appl. No.: 359,074

[22] Filed: Dec. 19, 1994

[51] Int. Cl.⁶ .......................... H01S 3/091; H01S 3/094
[52] U.S. Cl. .................. 372/75; 372/93; 372/99; 372/100
[58] Field of Search ...................... 372/75, 93, 97, 372/99, 100

[56] References Cited

U.S. PATENT DOCUMENTS

| | | | |
|---|---|---|---|
| 3,798,571 | 3/1974 | Segre | 372/97 |
| 4,025,172 | 5/1977 | Freiberg | 372/97 |
| 4,656,635 | 4/1987 | Baer et al. . | |
| 4,665,529 | 5/1987 | Baer et al. . | |
| 4,672,616 | 6/1987 | Trost et al. | 372/100 |
| 4,685,107 | 8/1987 | Kafka et al. . | |
| 4,685,111 | 8/1987 | Baer . | |
| 4,701,929 | 10/1987 | Baer et al. . | |
| 4,723,257 | 2/1988 | Baer et al. . | |
| 4,756,003 | 7/1988 | Baer et al. . | |
| 4,761,786 | 8/1988 | Baer . | |
| 4,785,459 | 11/1988 | Baer . | |
| 4,805,177 | 2/1989 | Martin et al. . | |
| 4,829,529 | 5/1989 | Kafka . | |
| 4,835,778 | 5/1989 | Kafka et al. . | |
| 4,837,771 | 6/1989 | Baer . | |
| 4,864,584 | 9/1989 | Martin . | |
| 4,872,177 | 10/1989 | Baer et al. . | |
| 4,894,839 | 1/1990 | Baer . | |
| 4,901,324 | 2/1990 | Martin . | |
| 4,908,832 | 3/1990 | Baer . | |
| 5,008,887 | 4/1990 | Kafka et al. . | |
| 5,008,895 | 4/1991 | Martin . | |
| 5,033,058 | 7/1991 | Cabaret et al. | 372/75 |
| 5,048,044 | 9/1991 | Ireland | 372/75 |
| 5,059,764 | 10/1991 | Baer . | |
| 5,080,706 | 1/1992 | Snyder et al. . | |
| 5,084,886 | 1/1992 | Martin . | |
| 5,091,915 | 2/1992 | Tatsumi et al. | 372/75 |
| 5,119,394 | 6/1992 | Scheps | 372/75 |
| 5,127,068 | 6/1992 | Baer et al. . | |
| 5,140,607 | 8/1992 | Paiva . | |
| 5,206,874 | 4/1993 | Opower | 372/97 |
| 5,257,277 | 10/1993 | Yagi et al. | 372/75 |

OTHER PUBLICATIONS

Koechner, W., *Solid State Laser Engineering*, pp. 176–177, Springer Verlag, 3rd Ed. (1992) No Month.

L. Marshall, A. Kaz and R. Brunham, "Highly efficient $TEM_{00}$ operation of transversley diode–pumped Nd:YAG lasers," *Optics Letters*, vol. 17, No. 3, pp. 186–188 (Feb. 1, 1992).

M. Selker, R. Afzal and P. Reichert, "A Pulse Transmission Mode Q–Switched Nd:YLF Laser Pumped by Cylindrical Microlens–collimated Diode Bars," *IEEE Journal of Quantum Electronics*, vol. 30, No. 7, pp. 1616–1622 (Jul. 1994).

H. Aier, S. Landro, G. Rustad, and K. Stenersen, "Efficient diode–laser side–pumped $TEM_{00}$–mode ND:YAG laser," *Optics Letters*, vol. 17, No. 24, pp. 1785–1787 (Dec. 15, 1992).

(List continued on next page.)

Primary Examiner—Rodney B. Bovernick
Assistant Examiner—Robert E. Wise
Attorney, Agent, or Firm—Dean W. Russell; Kilpatrick & Cody

[57] ABSTRACT

Methods and apparatus for side pumping lasers are disclosed. By pre-collimating radiation emitted by laser diode arrays, the present invention provides transverse mode matching to achieve fundamental, or $TEM_{00}$, mode operation in the corresponding (nominally vertical) axis. Optics associated with the resonant cavity additionally redirect energy longitudinally through the gain media, enhancing fundamental mode operation in the (nominally horizontal) other axis as well. With dual forty-watt linear arrays of laser diodes and four longitudinal passes, $TEM_{00}$ mode outputs exceeding fifteen watts have been achieved.

16 Claims, 12 Drawing Sheets

OTHER PUBLICATIONS

H. Verdun and T. Chuang, "Efficient TEM$_{00}$-mode operation of a Nd:YAG laser end pumped by a three-bar high-power diode-laser array," *Optics Letters,* vol. 17, No. 14, pp. 1000–1002 (Jul. 15, 1992).

J. Bernard and A. Alcock, "High-efficiency diode-pumped Nd:YVO, slab laser", Optics Letters, vol. 18, No. 12, pp. 968–970 (Jun. 15, 1993).

R. Koshel and I. Walmsley, "Modeling of the gain distribution for diode pumping of a solid-state laser rod with nonimaging optics," *Applied Optics,* vol. 32, No. 9, pp. 1517–1526 (Mar. 20, 1993).

A. Hays, L. Marshall, and R. Burnham, "High Powered CW Diode–Array–Pumped Nd:YAG Laser," *OSA Proceedings on Advanced Solid State Lasers,* vol. 10, pp. 255–256 (1991) No Month.

J. Kanisnski, W. Hughes, D. DiBase, P. Bournes, and R. Burnham, "One Joule Output From a Diode–Array–Pumped Nd:YAG Laser with Side–Pumped Rod Geometry," *IEEE Journal of Quantum Electronics,* vol. 28, No. 4, pp. 977–985 (Apr. 1992).

D. Welford, D. Rines, B. Dinerman, and R. Martinsen, "Observation of Enhanced Thermal Lensing Due to Near–Gaussian Pump Energy Deposition in a Laser–Diode Side–Pumped Nd:YAG Laser," *IEEE Journal of Quantum Electronics,* vol. 28, No. 4, pp. 1075–1080 (Apr. 1982).

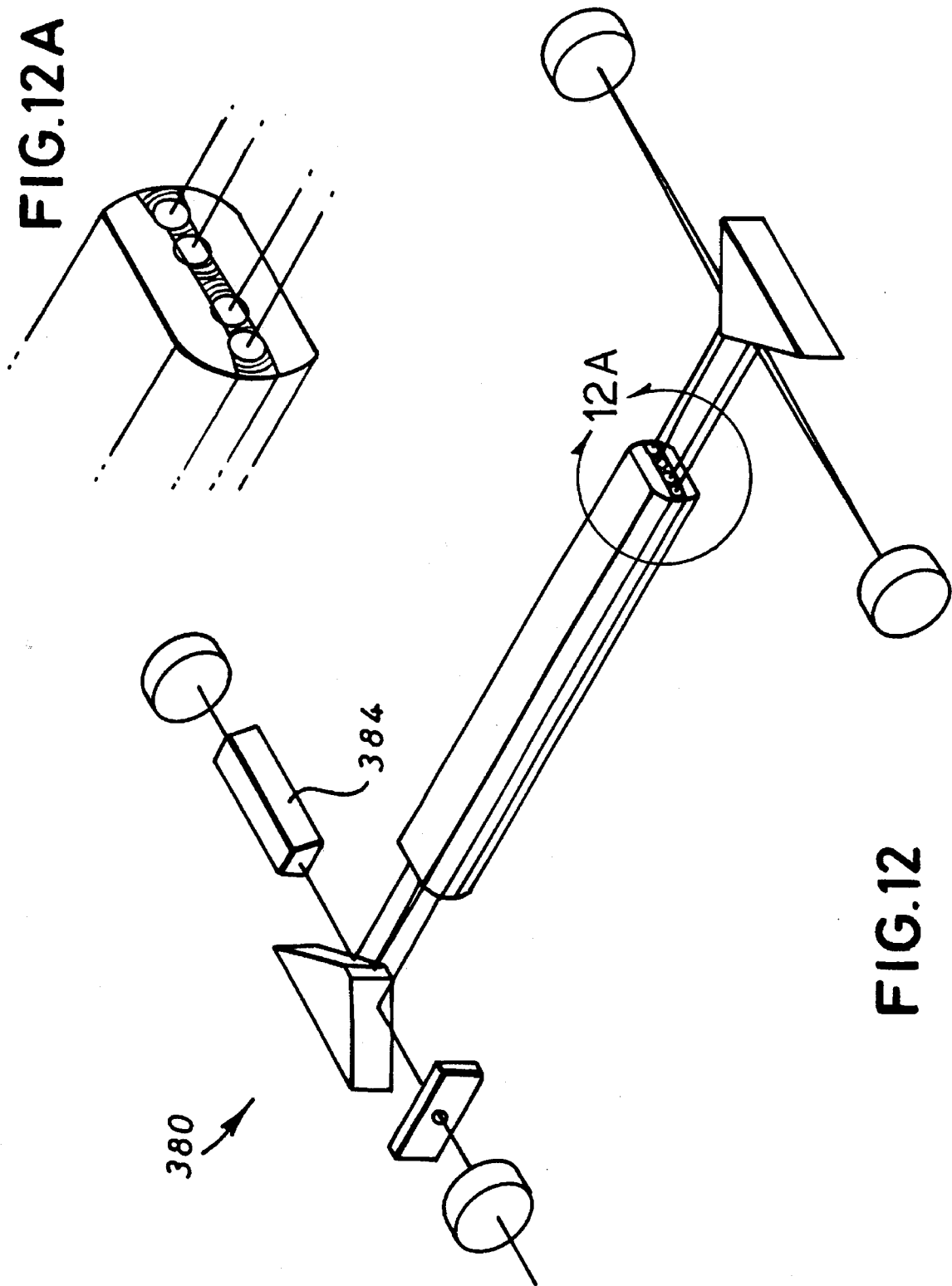

SIDE-PUMPED LASERS

FIELD OF THE INVENTION

This invention relates to side-pumped solid-state lasers and more particularly to diode-pumped lasers in which the fundamental ($TEM_{00}$) mode is matched to the gain region of the optical cavity in two axes.

BACKGROUND OF THE INVENTION

Broadband arc lamps or flashlamps are often used to excite, or "pump," solid-state laser gain media. These lamps are typically positioned parallel to an elongated crystalline structure doped with a rare earth element such as Neodymium (Nd). Radiation emitted by these lamps is absorbed through the sides of the gain media with the Neodymium atoms absorbing the pump radiation and re-emitting it at the lasing wavelength or wavelengths characteristic of the given gain media.

Surrounding or positioned adjacent the gain media of some relatively simple lasers are two mirrors. These mirrors act generally to form an optical resonant cavity through the gain media, redirecting the re-emitted radiation through the media until lasing results. Depending upon the configuration of the optical cavity, multiple modes of oscillation, or transverse electromagnetic modes (TEMs), may occur. Each TEM has a unique spatial characteristic within the resonant cavity, with the fundamental mode—$TEM_{00}$—both occupying the smallest volume within the cavity and having the lowest divergence. This mode additionally provides optimal focusing properties and displays a uniform Gaussian energy distribution across both the X (nominally horizontal) and Y (nominally vertical) axes. Operation in the $TEM_{00}$ mode, accordingly, is desired for virtually all applications of pulsed and continuous wave (CW) lasers.

Broadband arc lamps and flashlamps pump the entire gain media of the laser essentially indiscriminately. As a result, much of the pump energy that these lamps provide is directed to regions of the gain media outside the volume occupied by the $TEM_{00}$ mode, not substantially contributing to amplification of the $TEM_{00}$ laser beam but instead producing simultaneous oscillation of numerous TEMs and "mixed," or "multi"-mode, output. The efficiency of this pumping technique in converting pump light to the $TEM_{00}$ mode output is, therefore, relatively low.

Laser diodes present more efficient pumping sources. Often configured so as to "end" pump the gain media, these diodes can be positioned so that their collective pump volume more closely matches that of the $TEM_{00}$ mode. As noted in U.S. Pat. No. 4,908,832 to Baer (which patent is incorporated herein in its entirety by this reference), this end-pumping configuration of the diodes permits the pump direction to coincide with the longitudinal axis of the optical resonant cavity. It also limits the amount of energy that can be used and the resulting power of the laser, however; otherwise, power densities in the pump region of the gain media may become too great and produce heat exceeding that capable of being removed.

Laser Diodes may be used for side pumping gain media as well. As with broadband arc lamps and flashlamps, laser diodes may pump regions of the gain media outside the volume occupied by the $TEM_{00}$ mode. In such cases devices such as spatial apertures can be used to eliminate much of the undesirable multi-mode output. Spatial apertures concurrently diminish the power output of the device, however, resulting in decreased performance and efficiency. Suitable diodes for side and end pumping gain media include those specified in the Baer patent and also are available from Laser Diode Products, Inc., 1130 Somerset Street, New Brunswick, N.J. 08901.

Because neither side nor end pumping gain media using laser diodes produces optimal results, additional techniques have been suggested to enhance the power output of these lasing devices. One proposed approach is to pump both ends of the gain media, while another is to utilize multiple gain media within the same cavity configuration. The ultimate power output available using these techniques remains limited by the amount of energy input to the individual pumping sites and the number of accessible sites, however. As the number of sites and gain media increase, these techniques become increasingly difficult to implement effectively.

In the Feb. 1, 1992 issue of Optics Letters, Messrs. Larry R. Marshall, A. Kaz, and R. L. Burnham mention a "three-pass oscillator" for a pulsed laser in an article entitled "Highly efficient $TEM_{00}$ operation of transversely diode-pumped Nd:YAG lasers" (the "Fibertek article"). According to the authors of the Fibertek article, the fundamental mode path of the oscillator "traces a Z pattern through the gain volume," allowing "87% of the multimode energy to be extracted in the $TEM_{00}$ mode."

As shown schematically in FIG. 3 of the Fibertek article, a single two-dimensional (i.e. stacked) array of laser diodes, at least some of which are connected in parallel, abuts the cylindrical Nd:YAG rod. The small-diameter (3.5 mm) rod thus necessarily collimates the diode radiation itself, limiting the volume of the fundamental mode. The small-diameter rod additionally cannot absorb all of the optical radiation directed into it from the stacked diode array, precluding the gain media from being pumped from more than one side. Although not addressed in the Fibertek article, the rod size further likely cannot support more than three passes through the gain media without degrading the $TEM_{00}$ mode output of the device.

As a consequence of these (and other) limitations, the Fibertek article provides only "preliminary" experiments in connection with this technique. These limitations are also consistent with the results reported in the Fibertek article, which recounts higher outputs using a single-pass system having Brewster faces cut on the laser rod than with the Z pattern traced through the gain media. Notwithstanding the disclosure of the Fibertek article, therefore, there continues to exist a need for a scalable, multi-pass pumping mechanism providing greater output energy than conventional end-pumping methods and more efficiency than existing side-pumping techniques.

SUMMARY OF THE INVENTION

The present invention provides such a pumping mechanism. By using side pumping together with one or more collimating lenses, the present invention provides transverse mode matching to achieve fundamental, or $TEM_{00}$, mode operation in the corresponding (nominally vertical) axis. Optics associated with the resonant cavity additionally redirect energy longitudinally through the gain media, enhancing fundamental mode operation in the other (nominally horizontal) axis as well. The results are side-pumping techniques that not only are scalable for greater rod lengths, but also are more efficient than conventional side-pumping methods.

Embodiments of the present invention typically include a linear diode array positioned near each of the two sides of the gain media. A generally cylindrical lens associated with each array collects and collimates optical radiation emitted by the array, directing it into the gain media. The sides of the gain media themselves may be curved (confocally) to provide additional collimation, producing an excitation region within the media having an approximately rectangular cross section.

Rather than solely employing spatial apertures to inhibit multi-mode oscillations in the horizontal axis, the present invention utilizes multiple longitudinal passes through the gain media to discriminate against higher-order modes. This discrimination, a form of "gain aperturing," occurs as the higher-order modes—competing for the same physical space—overlap and effectively crowd each other to produce nulls or areas of low gain. In essence, the present invention "folds" the optical cavity within the gain media so that the $TEM_{00}$ mode volumes either are tangential or overlap only slightly, absorbing virtually all of the available gain.

Experimental results using embodiments of the invention suggest that as few as two longitudinal passes through the gain media enhance this $TEM_{00}$ mode output. Using two linear laser diode arrays of forty watts each and four longitudinal passes have resulted in output powers exceeding fifteen watts in the $TEM_{00}$ mode. In these cases the "gain aperturing" achieved through the present invention effectively obviates the need for spatial aperturing, avoiding its associated losses entirely.

Although useful for CW lasers, the present invention operates with Q-switched lasers and may be employed with quasi-CW, pulsed, and mode-locked lasers as well. In experiments involving acousto-optic Q-switching, output energies per pulse five times greater than those currently commercially available have been obtained. Because the diode arrays of the present invention are not positioned adjacent the ends of the rod, moreover, both the size of the arrays and the length of the gain media may be scaled to provide even greater output powers.

Selected two-pass embodiments of the present invention have an optical cavity comprising an oblong Nd:YAG rod interposed between a "fold" mirror and a prism having highly-reflective faces. A separate mirror is also optically coupled to the prism, as is an output coupler for the resulting laser beam. By inserting a suitable spatial aperture between the rod and fold mirror, $TEM_{00}$ outputs of approximately three watts may be achieved in both the horizontal and vertical axes. Other two-pass embodiments omit the separate fold mirror, using instead a Nd:YAG rod having three faces at one end.

Embodiments of the present invention supplying three optical paths longitudinally through the gain media similarly may include a fold mirror optically coupled to a highly-reflective prism. These embodiments also comprise a second fold mirror coupled to the prism and substitute for the oblong rod described above one having three faces at one end. Although two of the faces reflect light incident at 45°, the third incorporates an anti-reflective coating for optical connection to the output coupler. Unlike the rudimentary disclosure of the Fibertek article, furthermore, the present invention neither employs multiple D-shaped (or semicircular) high reflectors nor positions such reflectors in the manner shown in FIG. 3 of that article. Resulting fundamental mode outputs of the these three-pass embodiments currently exceed ten watts.

Even greater output powers are achievable using the four-pass techniques of the present invention. The optical cavity of these embodiments includes an appropriate rod positioned between a prism at one end and a truncated prism at the other, each having highly reflective surfaces facing the bounded rod. A pair of fold mirrors are positioned opposite the sides of the prism, while a third mirror is optically coupled to a face of the truncated prism. Another face of the truncated prism is coupled to the output coupler to supply the resulting laser beam. Because this configuration produces virtually no TEM oscillation outside the $TEM_{00}$ mode, no spatial aperturing need typically be employed.

It is therefore an object of the present invention to provide an improved side-pumped laser.

It is also an object of the present invention to provide a side-pumped laser having a resonant cavity through which energy is redirected longitudinally.

It is another object of the present invention to provide side-pumping techniques that are scalable for greater rod lengths.

It is an additional object of the present invention to provide a lasing assembly including at least one collimating lens associated with an array of laser diodes.

It is a further object of the present invention to provide methods of discriminating against non-fundamental modes of oscillation through gain aperturing.

It is yet another object of the present invention to provide diode-pumped lasers in which the fundamental mode is matched to the gain region of the cavity in two axes.

It is also an object of the present invention to provide $TEM_{00}$ mode outputs exceeding fifteen watts using two linear diode arrays, each emitting optical radiation approximating forty watts.

Other objects, features, and advantages of the present invention will become apparent with reference to the remainder of the written portion and the drawings of this application.

BRIEF DESCRIPTION OF THE DRAWINGS

FIG. 1A is a perspective view of one end of the rod of FIG. 1 illustrating the spatial volumes associated with various TEMs.

FIG. 5A is a perspective view of one end of the rod of FIG. 5 illustrating the spatial volumes associated with various TEMs.

FIG. 8A is a perspective view of one end of the rod of FIG. 8 illustrating the spatial volumes associated with various TEMs.

FIGS. 10A–B are perspective views of the ends of the rod of FIG. 10 illustrating the spatial volumes associated with various TEMs.

FIG. 12 is a perspective view of the optical cavity, including the rod and an optional spatial aperture, of the laser of FIG. 11.

FIG. 12A is a perspective view of one end of the rod of FIG. 12 illustrating the spatial volumes associated with various TEMs.

DETAILED DESCRIPTION

Figure 1:
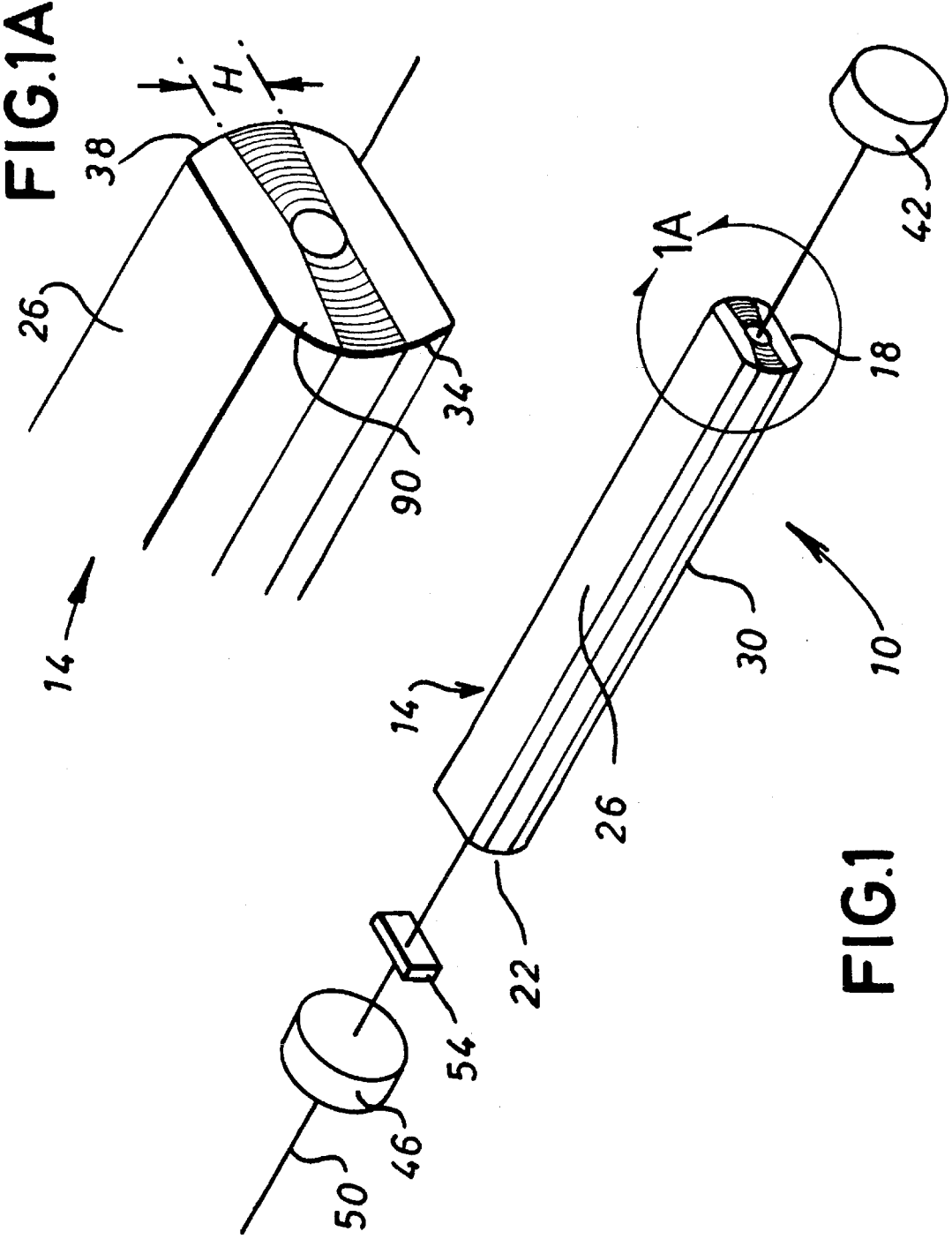
FIG. 1 is a perspective view of an optical cavity including a rod consistent with the present invention.

Illustrated in FIG. 1 is optical resonant cavity 10, including rod 14 of lasing material having ends 18 and 22. Rod 14 comprises an elongated crystalline structure, typically (although not necessarily) Nd:YAG, with ends 18 and 22 coated with antireflective material at the lasing wavelength. As shown in FIG. 1, rod 14 may have an oblong shape, with its respective top and bottom surfaces 26 and 30 being essentially flat and its respective first and second sides 34 and 38 having convex curves with antireflective coatings at nominally 808 nm. The Neodymium (or other appropriate) atoms within rod 14 emit certain absorbed radiation at the lasing wavelength.

Positioned adjacent end 18 is mirror 42, which reflects radiation emitted by the rod incident upon its surface. Adjacent end 22 of rod 14 is output coupler 46, through which the resulting laser beam 50 passes. Together, rod 14, mirror 42, and output coupler 46 form cavity 10, with the gain media incorporated within rod 14. If desired, spatial aperture 54 may be interposed between end 22 and output coupler 46 to filter the portion of beam 50 oscillating at other than the fundamental, or $TEM_{00}$, mode.

Figure 2:
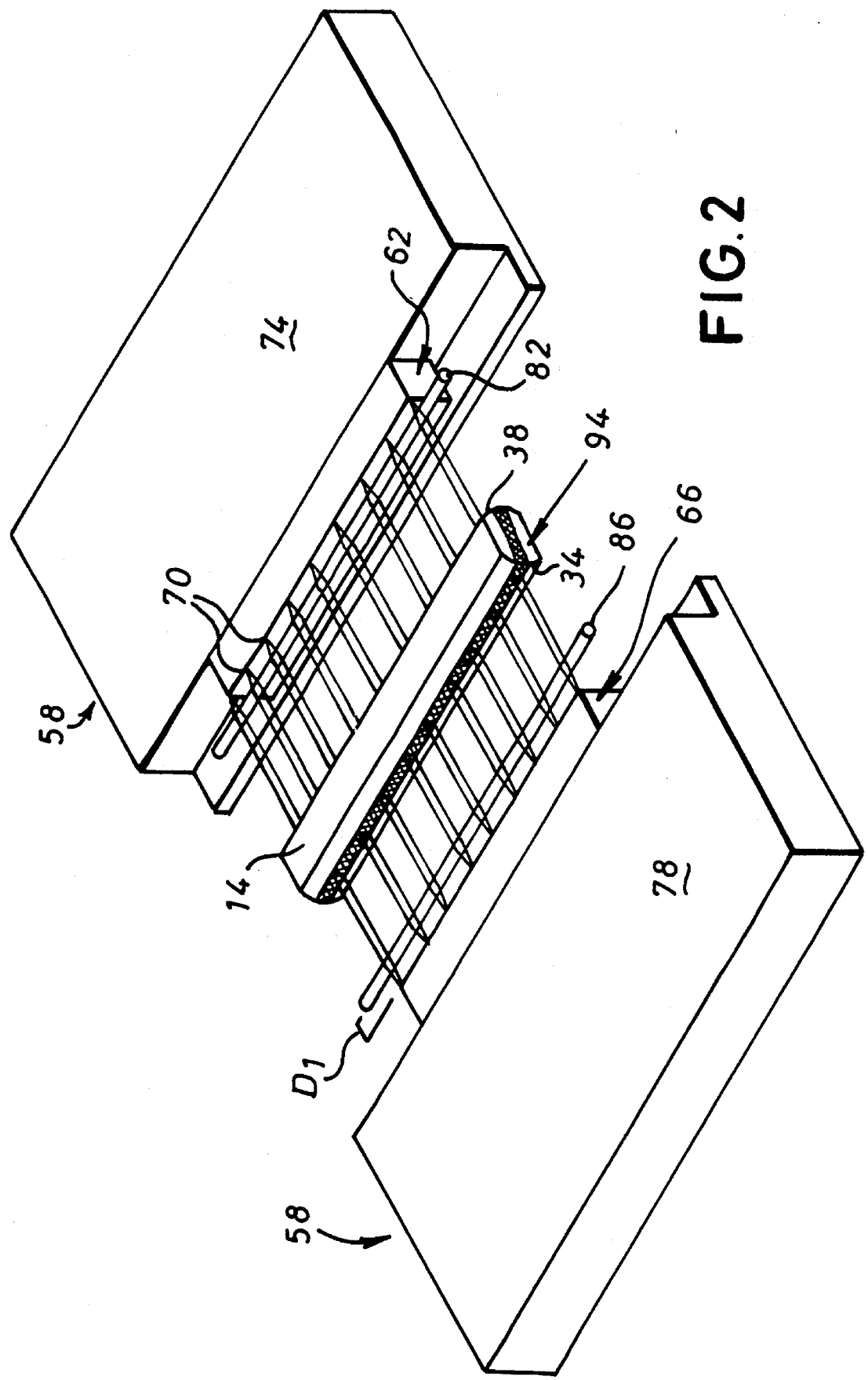
FIG. 2 is a perspective view of a mechanism for transversely pumping the rod of FIG. 1.

FIG. 2 shows a mechanism, or assembly 58, useful for pumping the gain media of rod 14. In embodiments of the invention consistent with FIG. 2, assembly 58 comprises opposed arrays 62 and 66 of laser diodes. Each of arrays 62 and 66 contains a single row of multiple, series-connected diodes 70 positioned to emit optical radiation toward rod 14. Although in some embodiments arrays 62 and 66 contain twenty-five diodes 70 (with adjacent diodes 70 placed approximately 0.085" apart), an important feature of the invention is that arrays 62 and 66 are scalable: as the length of selected rod 14 increases, so too may the number of diodes 70 in arrays 62 and 66. Arrays 62 and 66 may be mounted on heat sinks 74 and 78, respectively, to remove excess heat generated by diodes 70 in use. Alternatively, integrated laser diode bars may be used in place of arrays 62 and 66.

Positioned intermediate array 62 and second side 38 is lens 82. Generally cylindrical and with a radius of curvature "$R_{CL}$," lens 82 collects optical radiation emitted by diodes 70 of array 62 before directing it into the gain media of rod 14. Using known optical equations, $R_{CL}$ and the distance $D_1$ between array 62 and lens 82 may be selected so as to collimate the light emanating from array 62. Depending on the respective diameters of lens 82 and rod 14, alternatively, lens 82 may make the radiation directed toward rod 14 slightly convergent as shown, for example, in FIG. 3. Lens 82, therefore, effectively "precollimates" the optical radiation directed toward rod 14. As a consequence, merely adjusting either or both of $R_{CL}$ and $D_1$ enhances the vertical mode-matching ability of assembly 58 independent of rod 14.

Figure 3:
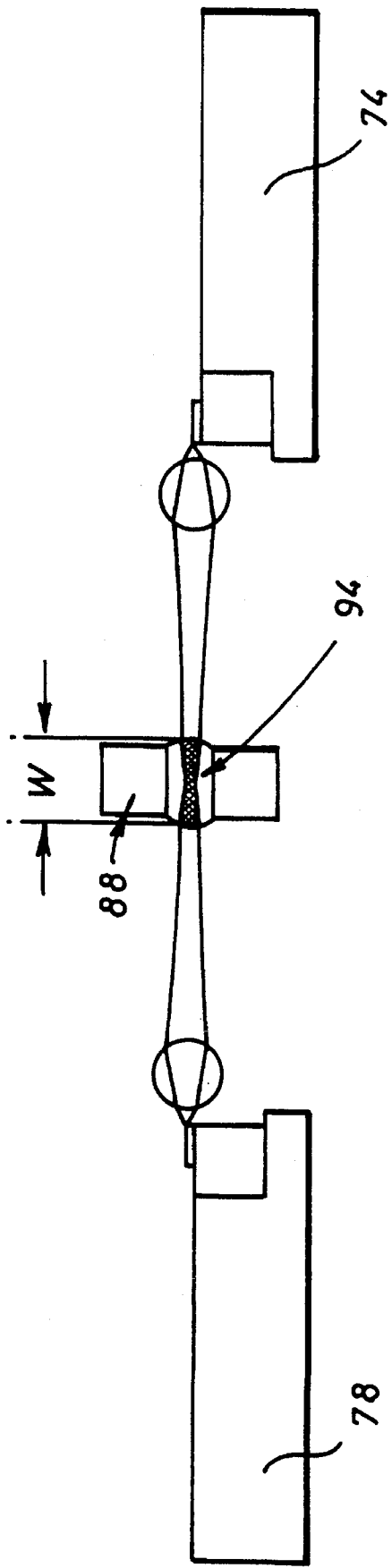
FIG. 3 is an end view of the mechanism of FIG. 2.

Lens 86 is similarly positioned intermediate array 66 and first side 34 of rod 14. Like lens 82, lens 86 is generally cylindrical and may be formed of fused silica or other glass. Lens 86 pre-collimates radiation emitted by diodes 70 of array 66, symmetrically directing the collimated light rays toward rod 14. As illustrated in FIG. 2, lenses 82 and 86 typically are at least as long as rod 14, ensuring that a substantial portion of the radiation emitted by diodes 70 is directed appropriately toward rod 14. FIG. 3 additionally shows a separate heat sink 88 to which rod 14 may be mounted.

FIGS. 1A, 2 and 3 detail the mode structure 90 of the gain media within rod 14 and cavity 10 when assembly 58 is used. First and second sides 34 and 38 of rod 14 are curved to provide additional redirection (or collimation) of the radiation emitted by diodes 70. The result is an excitation region 94 that has an approximately rectangular cross section. As best shown in FIG. 1A, within excitation region 94 reside various TEMs of mode structure 90, with the space occupied by the $TEM_{00}$ mode centrally located therein. By pumping the sides 34 and 38 of rod 14 using arrays 62 and 66 and pre-collimating the optical radiation utilizing lens 82 and 86, assembly 58 is effectively matched to the $TEM_{00}$ mode in the vertical axis. Consequently, the height H of excitation region 94 is approximately equal to the diameter of the $TEM_{00}$ mode volume. By contrast, the width W of excitation region 94 is substantially greater than that of the fundamental mode, it not being matched to the mode volume.

Figure 4:
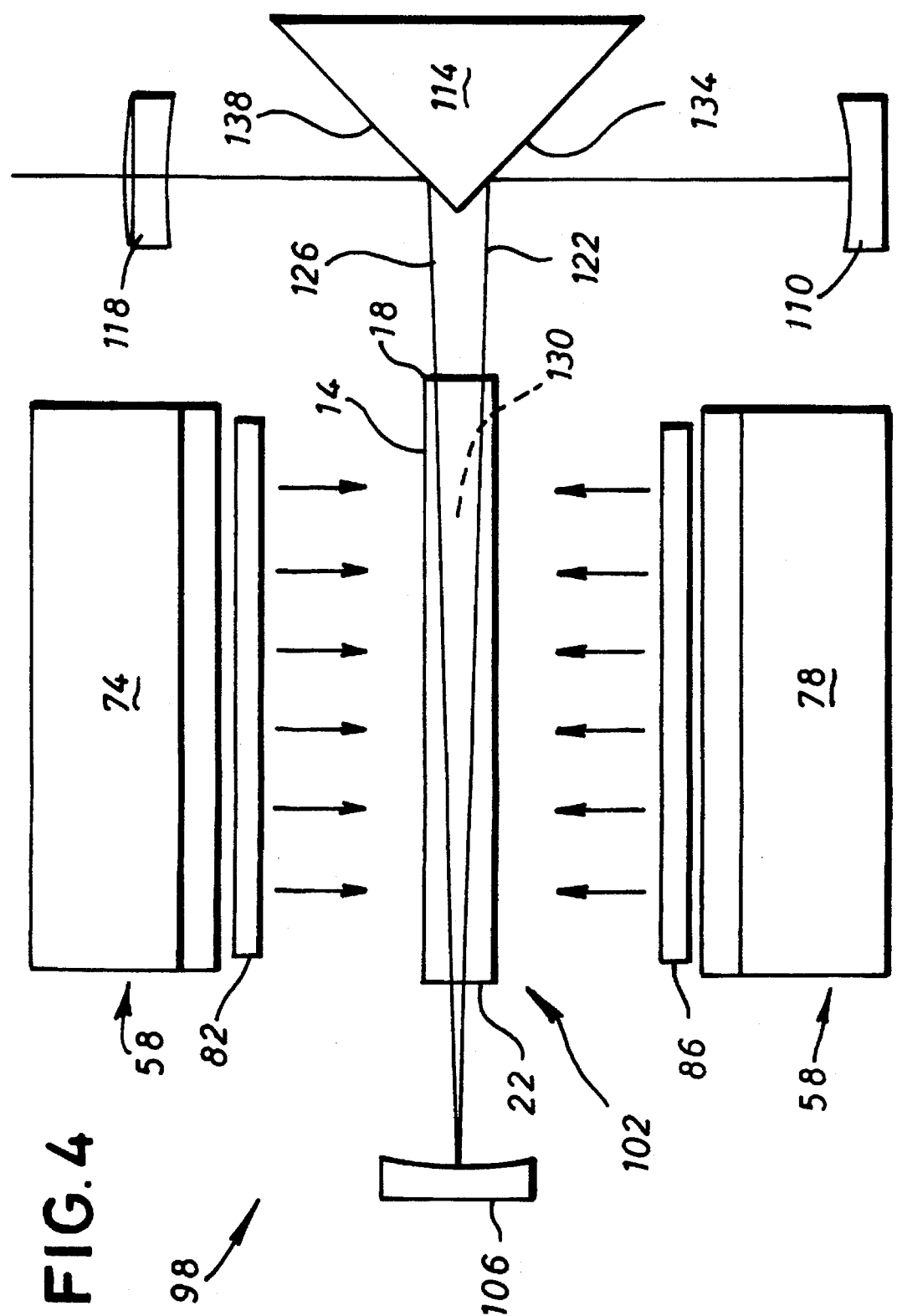
FIG. 4 is a top plan view of a two-pass, side-pumped laser of the present invention.
Figure 5:
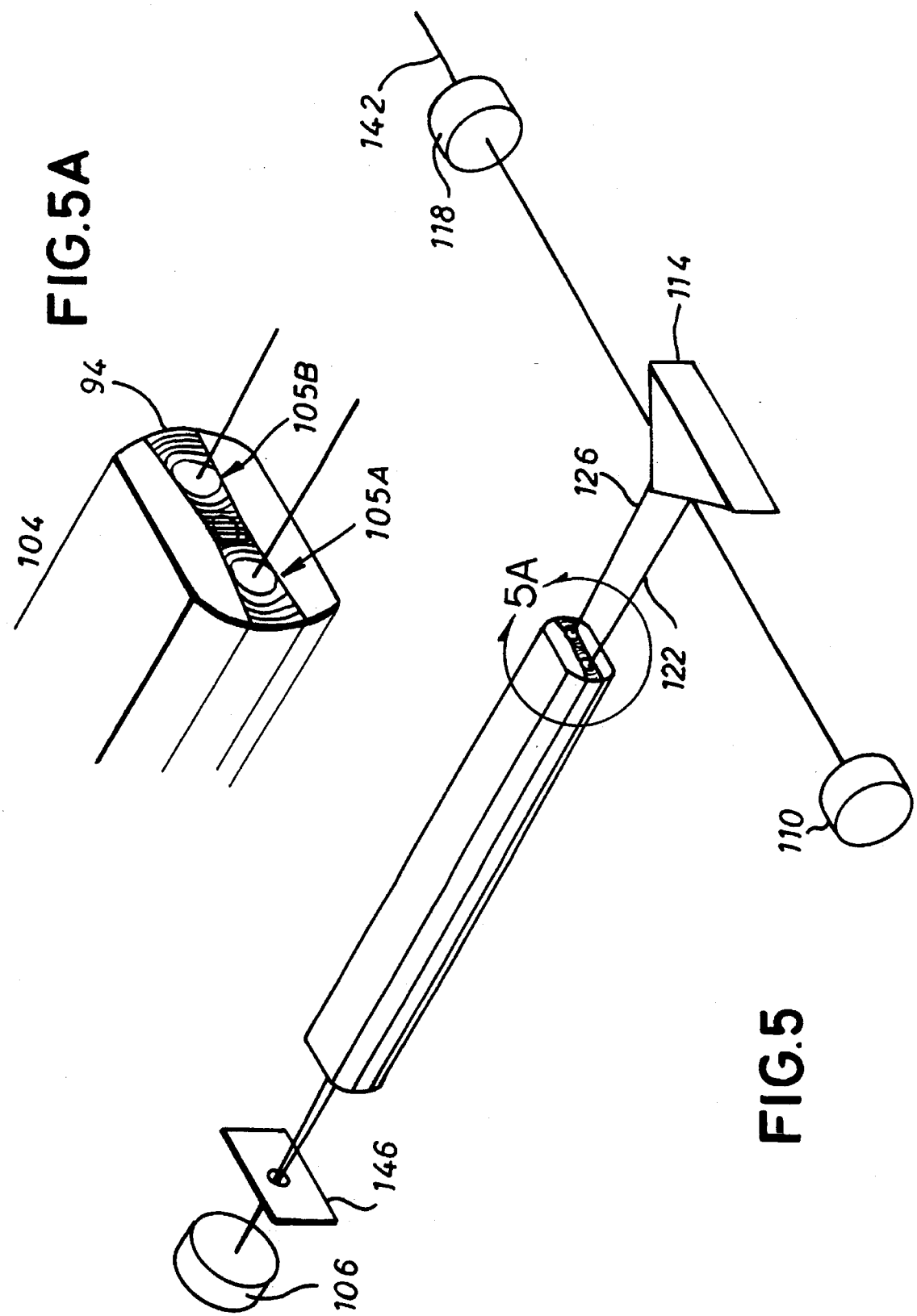
FIG. 5 is a perspective view of the optical cavity, including the rod and an optional spatial aperture, of the laser of FIG. 4.

The lasing system 98 of FIGS. 4–5 counteracts the lack of correspondence between width W and the horizontal volume of the $TEM_{00}$ mode. By passing optical radiation longitudinally through the gain media of rod 14 at different locations, effectively "folding" optical resonant cavity 102, additional regions of fundamental mode oscillations are formed. FIG. 5A, for example, illustrates the mode structure 104 of system 98 at end 18 of rod 14, in which two regions 105A and 105B of $TEM_{00}$ mode oscillation (rather than one) appear. As a consequence, more of excitation region 94 is subsumed within the fundamental mode volume of rod 14, more closely matching that volume with the width W of the excitation region 94.

In other words, system 98 of the present invention permits the $TEM_{00}$ modes—whose volumes do not overlap—to experience greater gain in the (nominally) horizontal axis. It also causes higher-order modes, which occupy larger volumes of space than the fundamental mode, to overrun (or "crowd") each other and themselves, thereby experiencing greater losses and lower gain. The result of this "gain aperturing" is increased output power of the fundamental mode.

As detailed in FIGS. 4–5, optical cavity 102 of system 98 includes reflectors 106 and 110, prism 114, and output coupler 118 as well as rod 14. Reflector 106, whose reflective surface is slightly concave, is positioned adjacent end 22 of rod 14, while prism 114 may be placed adjacent opposite end 18. Together with reflector 110, reflector 106 and prism 114 provide a geometry supplying two longitudinal optical paths 122 and 126 through the gain media of rod 14. Because TEMs are associated with each of the two paths 122 and 126, two $TEM_{00}$ mode volumes are thus present. FIG. 5A, as noted above, illustrates regions 105A and 105B of $TEM_{00}$ mode oscillation at end 18 of rod 14. Similar regions exist at end 22 of rod 14, although the fundamental mode volumes at that end are more closely adjacent an imaginary centerline 130 of the rod 14.

Prism 114 of system 98 may be a conventional right-angle prism having adjoining surfaces 134 and 138 that are highly reflective. Surface 134 is optically coupled to the reflective surface of reflector 110, while surface 138 interacts with output coupler 118 to provide the output beam 142 of the laser system 98. Reflector 106, in turn, functions as the vertex of the V-shaped paths 122 and 126. Suitable reflectors 106 and 110 may be obtained from Virgo Optics (a division of Sandoz Chemicals Corp.), 6736 Commerce Avenue, Port Richey, Fla. 34668, and prism 114 is manufactured by, among others, Lightning Optical Corporation, 431 E. Spruce Street, Tarpon Springs, Fla. 34689. If desired, spatial aperture 146 may be interposed between reflector 106 and end 22 of rod 14 to reduce the non-fundamental mode output of the laser.

Figure 6:
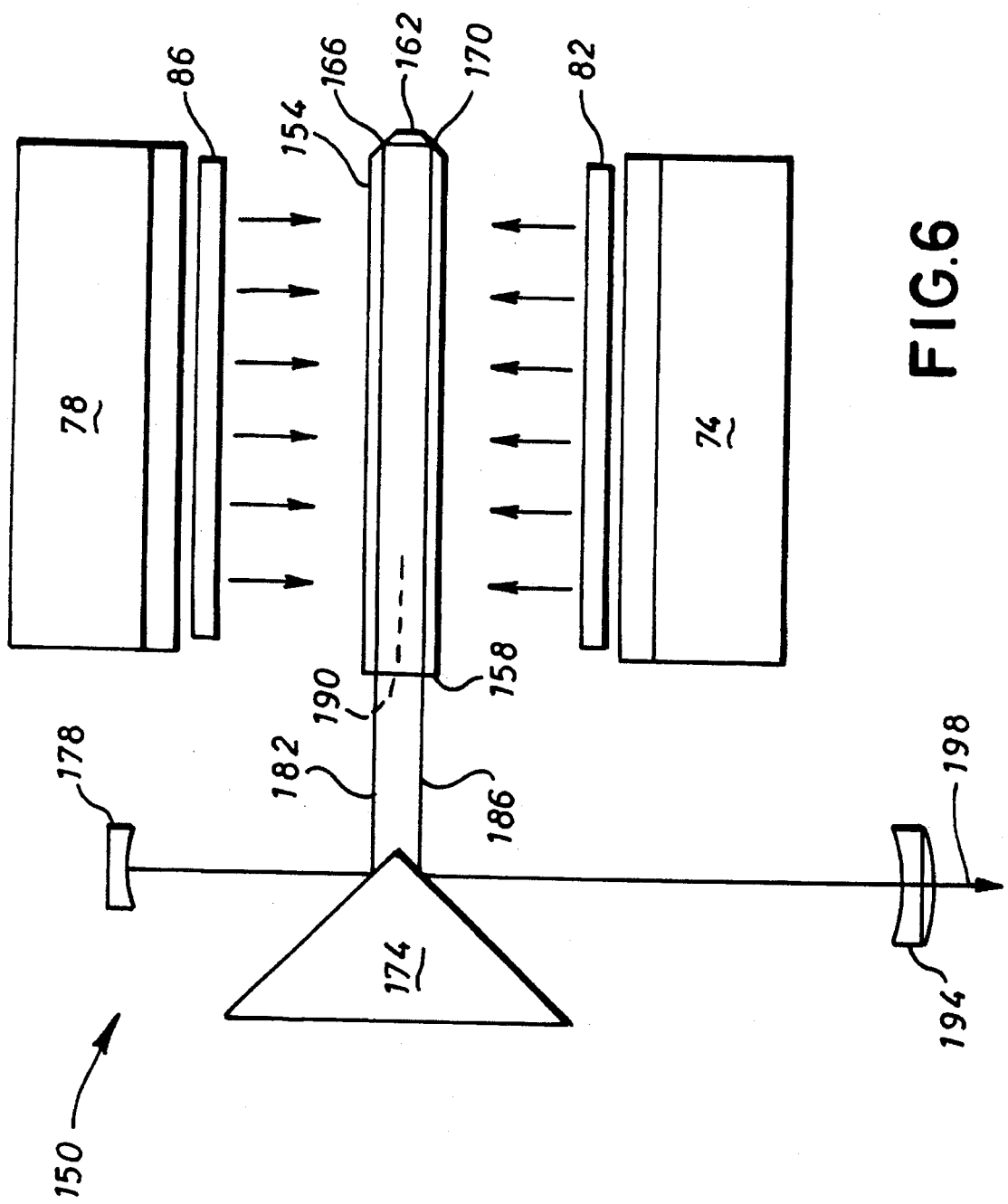
FIG. 6 is a top plan view of an alternate embodiment of the two-pass, side-pumped laser of FIG. 4.

Consistent with the fact that the present invention is not limited to specific optical geometries, FIG. 6 illustrates an alternative embodiment of system 98. Unlike system 98, system 150 omits reflector 106 adjacent end 22 of rod 14, utilizing an alternative rod 154 instead. Rod 154 includes opposed ends 158 and 162, with end 158 substantially similar to that of end 18. End 162, by contrast, is multi-sided, with faces 166 and 170 that are optically coated to be highly reflective to light incident at 45°. In conjunction with prism 174 and reflector 178, faces 166 and 170 furnish optical paths 182 and 186 longitudinally through rod 154. Paths 182 and 186 result in the presence of two $TEM_{00}$ mode volumes, similar to those associated with paths 122 and 126. Because paths 182 and 186 are parallel (rather than V-shaped) within rod 154, however, the fundamental modes are substantially equidistant centerline 190 at both ends 158 and 162. Output coupler 194 presents the output beam 198 of system 150.

Figure 7:
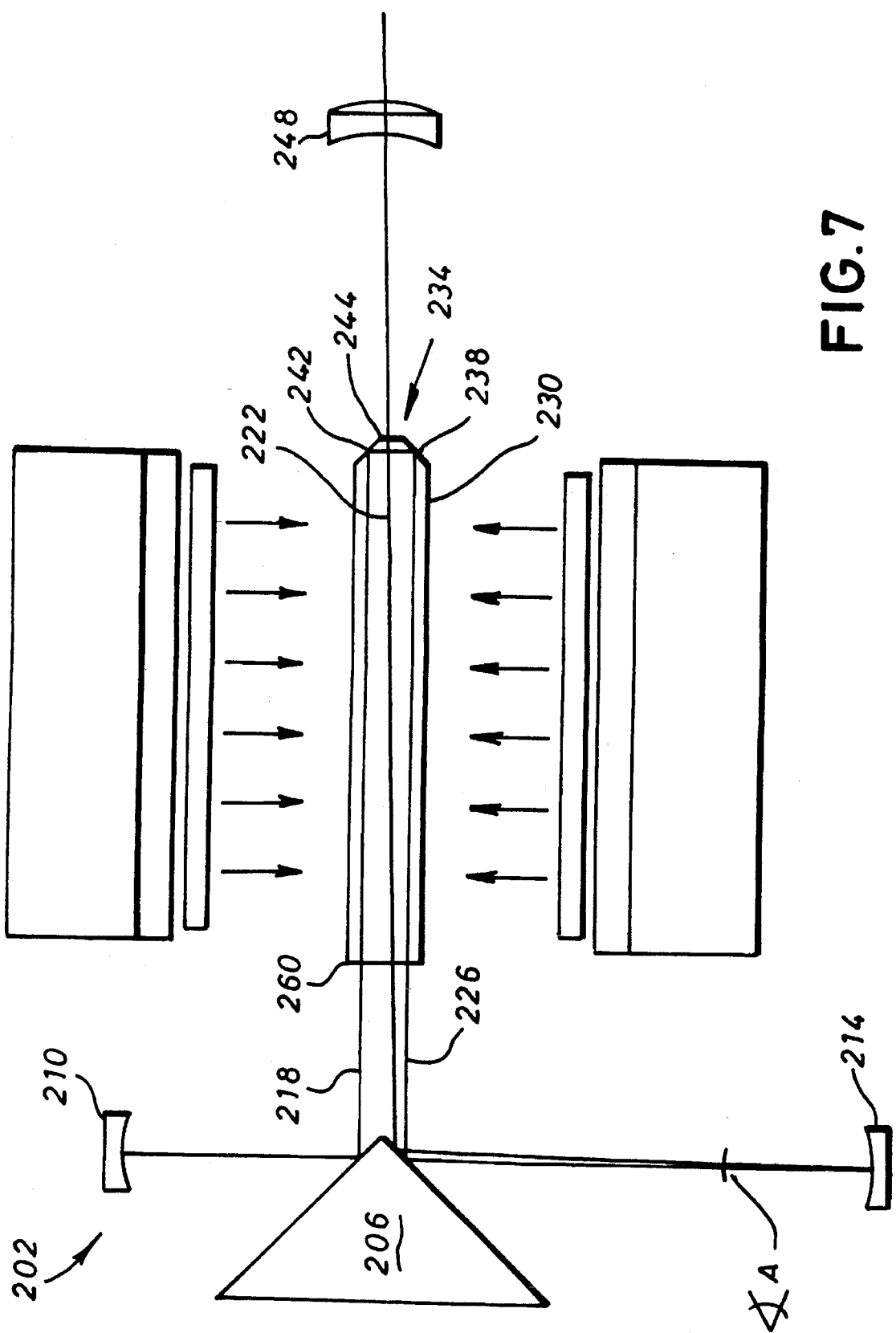
FIG. 7 is a top plan view of a three-pass, side-pumped laser of the present invention.
Figure 8:
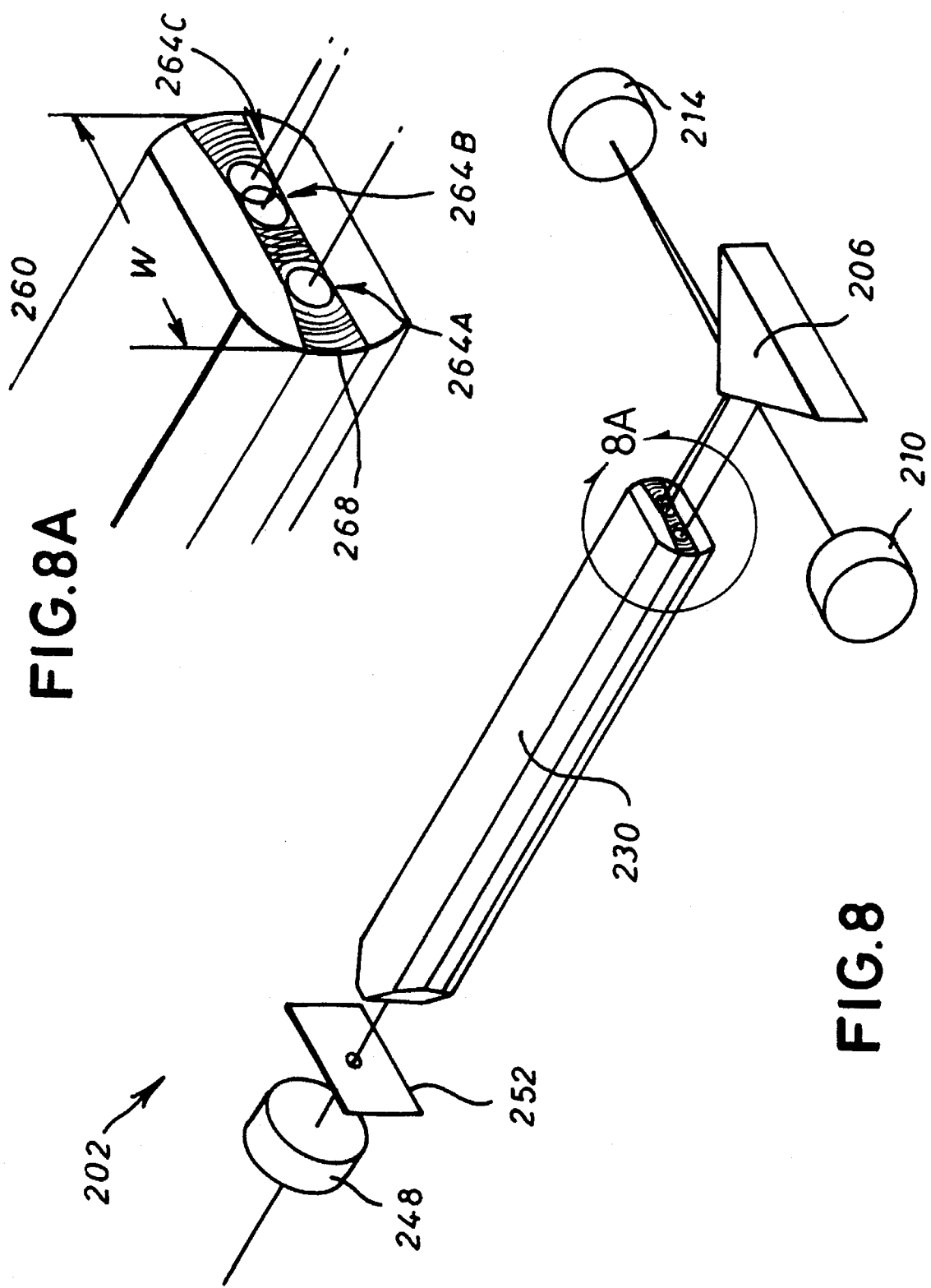
FIG. 8 is a perspective view of the optical cavity, including the rod and an optional spatial aperture, of the laser of FIG. 7.

FIGS. 7–8 show an exemplary three-pass, side-pumped laser 202 of the present invention. Prism 206 and reflectors 210 and 214 are coupled so as to provide longitudinal paths 218, 222, and 226 through the gain media of rod 230. As best illustrated in FIG. 7, paths 218 and 226 are essentially parallel through the gain media of rod 230, their connection at end 234 of rod 230 made because faces 238 and 242 are highly reflective to light incident at 45°. Face 244 of end 234 is antireflectively coated to be transmissive, however, permitting light rays travelling along path 222 to exit rod 230 to output coupler 248. Reflector 214 is positioned so as to separate paths 222 and 226 within rod 230, providing, in the embodiment of laser 202 shown in FIG. 7, an angle A approximating 1°. As with the other embodiments of the present invention, however, those skilled in the art will recognize that alternate geometries and components may be used if they produce satisfactory results.

FIG. 8 again illustrates a spatial aperture 252 that may be used if other than multi-mode output is desired. FIG. 8A, moreover, details the mode structure 256 of the gain media at end 260 of rod 230. As visible therein, some overlap of fundamental mode volumes 264A, 264B, and 264C may occur. Together, however, volumes 264A–C occupy a substantial portion of the width W of excitation region 268, further crowding, or reducing, the volumes otherwise occupied by the higher-order modes. Although not shown in FIG. 8A, as is apparent from FIG. 7 the mode structure at end 234 of rod 230 will include even less overlap among the fundamental mode volumes, subsuming yet additional space within the gain media.

Figure 9:
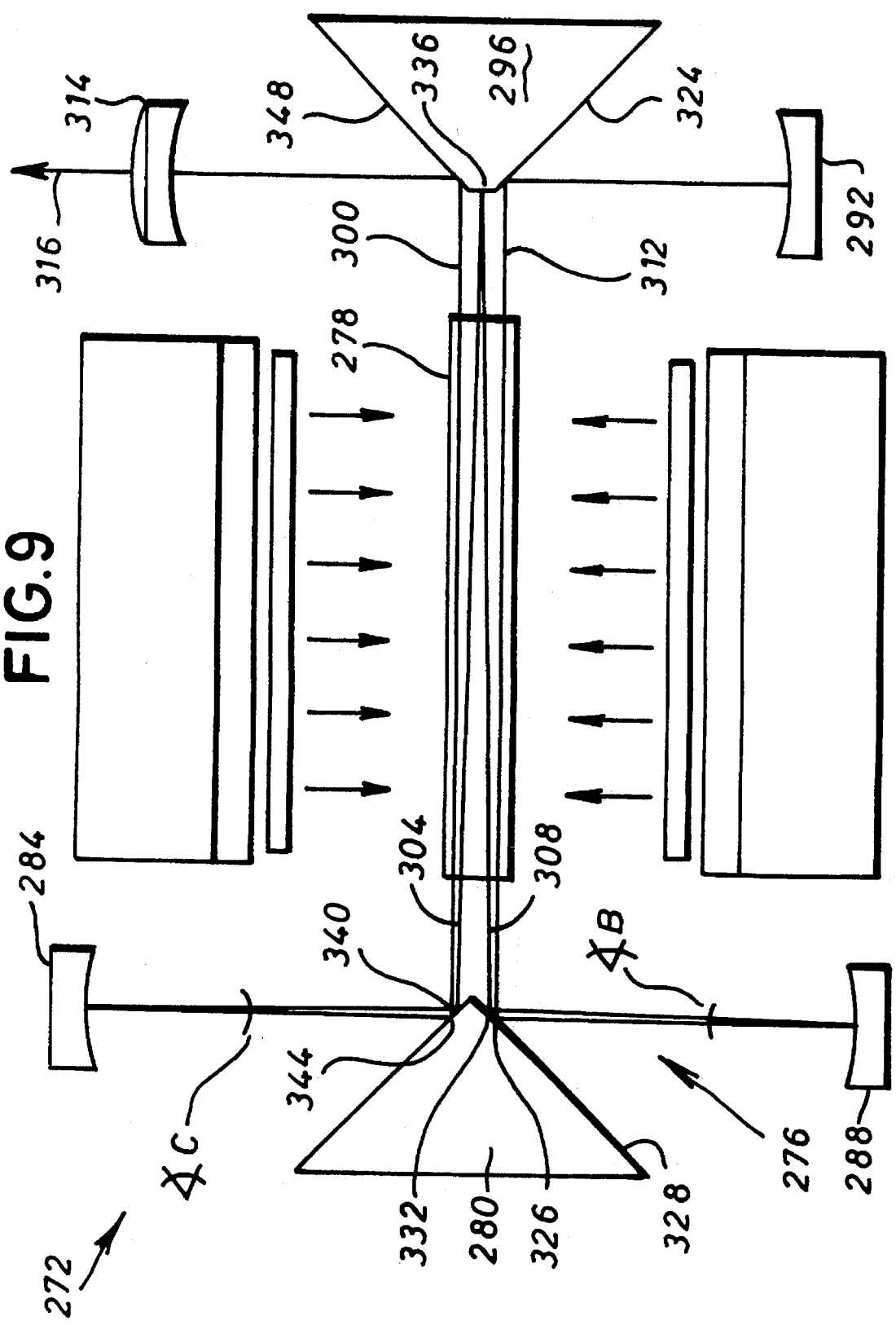
FIG. 9 is a top plan view of a four-pass, side-pumped laser of the present invention.
Figure 10:
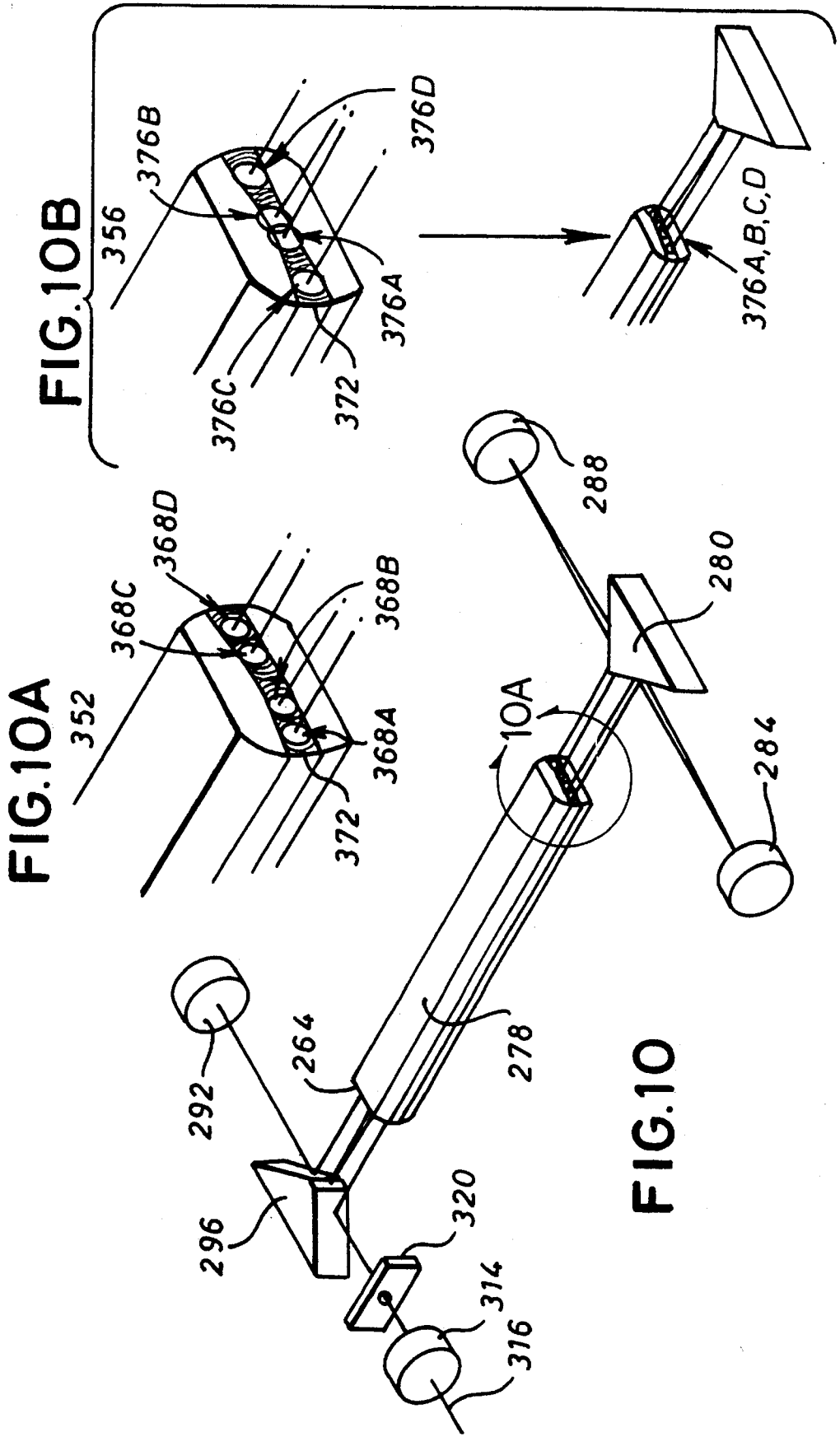
FIG. 10 is a perspective view of the optical cavity, including the rod and an optional spatial aperture, of the laser of FIG. 9.

Four-pass laser 272 of the present invention (FIGS. 9–10) further enhances the fundamental mode output of the system. Resonant cavity 276 of laser 272 incorporates not only rod 278, prism 280, and reflectors 284, 288, and 292, but truncated prism 296 as well. These optical devices produce four longitudinal paths 300, 304, 308, and 312 through the gain media of rod 278, providing with output coupler 314 an output beam 316 composed almost exclusively of radiation in the $TEM_{00}$ mode. Thus, although FIG. 10 illustrates spatial aperture 320, that component is generally unnecessary to avoid substantial multi-mode output.

Traced nominally from a point on path 312, radiation emitted by rod 278 in the fundamental mode may travel along that path to reflective surface 324 of truncated prism 296, where it is reflected onto the surface of reflector 292 and back to surface 324. From there, the radiation may travel through the gain media of rod 278 along path 312 to a first location 326 on reflective surface 328 of prism 280, reflecting from that surface to reflector 288. In reflecting the radiation, reflector 288 changes its direction an acute angle B, so that it encounters surface 328 at a second location 332 rather than first location 326. As a result, the radiation is thereafter reflected through rod 278 along path 308.

After exiting rod 278 along path 308, the radiation contacts reflective surface 336 of truncated prism 296, redirecting it through rod 278 along path 304. Upon reaching first location 340 of prism 280, the radiation is reflected toward reflector 284 and redirected at an acute angle C to second location 344 of the prism 280. The radiation thereafter passes yet again through rod 278 along path 300 (parallel to path 312), reflected off surface 348 of truncated prism 296 to output coupler 314.

FIGS. 10A and 10B illustrate the mode structures 352 and 356 present at ends 360 and 364 of the Nd:YAG rod 278. Mode structure 352 includes four non-overlapping $TEM_{00}$ volumes 368A, 368B, 368C, and 368D that together occupy substantially all of the space available in excitation region 372. Clearly visible in FIG. 10A is the limited remaining space within excitation region 372—primarily in the center—available for higher-order modes. FIG. 10B shows that the center of excitation region 372 near end 360, moreover, is subsumed within $TEM_{00}$ volumes 376A and 376B, further nulling the space available for higher-order modes. Although fundamental mode volumes 376A and 376B overlap, they thus nonetheless assist in suppressing non-fundamental mode oscillations. Also shown in FIG. 10B are $TEM_{00}$ volumes 376C and 376D created by passing radiation along respective paths 300 and 312.

Using a system of the present invention including a Nd:YAG rod (2.25" long and 0.3" wide) and an assembly 58 with diodes 70 collectively emitting eighty watts of radiation (i.e. forty watts per each array 62 and 66), the following results have been achieved:

| Number of Longitudinal Passes | Multi-mode (total) Output (watts) | Fundamental Mode Output (watts) |
| --- | --- | --- |
| 1 | 15 | 0.5 |
| 2 | 15 | 3 |
| 3 | 15 | 10 |
| 4 | 18 | 13 |

Employing arrays 62 and 66 each emitting forty-five watts, furthermore, multi-mode and fundamental outputs of, respectively, twenty-seven and nineteen watts may be obtained with four longitudinal passes.

The table clearly evidences the substantial benefits of employing the multi-pass systems of the present invention, which can provide more than twenty-five times the fundamental mode output of conventional single-pass lasers. For each of the one-, two-, and three-pass systems, a spatial aperture was utilized to filter the non-fundamental mode output. The four-pass system requires no such aperture, however, substantially depleting the non-fundamental mode output through the "gain aperturing" discussed above.

Figure 11:
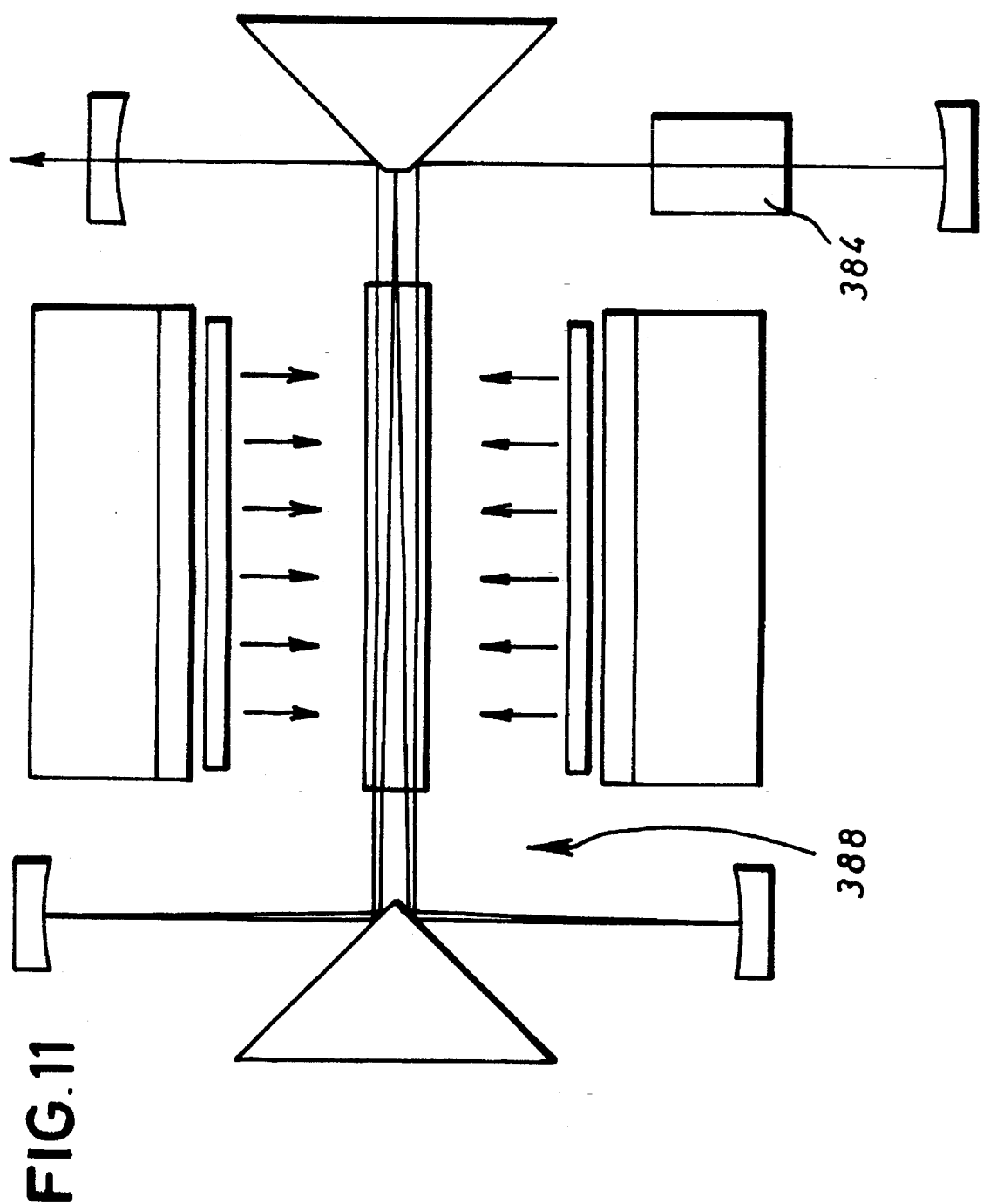
FIG. 11 is a top plan view of a four-pass, Q-switched, side-pumped laser of the present invention.

Moreover, because the present invention does not inherently limit either the length or the diameter (width) of the doped rod, substantially longer and incrementally wider rods can be employed. Using a longer rod, for example, would permit additional radiation to be directed toward it using longer arrays 62 and 66, while utilizing a wider rod would allow additional passes through the gain media without too much overlap of $TEM_{00}$ mode volumes. The present invention is not restricted to CW lasers, furthermore, but may be used with pulsed, Q-switched, quasi-CW, and other lasers as well. FIGS. 11–12 illustrate a four-pass system 380 similar to laser 272 and incorporating Q-switch 384. As those skilled in the art understand, Q-switch 384 can effectively block optical cavity 388 temporarily, employing radio frequency (RF) energy to change its refractive index as desired to provide a high-gain output of, typically, brief duration. Concepts such as frequency doubling and mode locking also may be practiced in connection with the invention.

Clearly demonstrated is that the present invention, which combines transverse mode matching with multiple longitudinal passes through the gain media, achieves fundamental mode control in both the X and Y axes. Additional benefits accrue from use of a non-cylindrical, essentially oblong rod within the optical cavity, which optimizes the shape of the excitation region for the multi-pass systems. The separate cylindrical lenses further enhance the mode matching achievable in accordance with the invention by pre-collimating the diode radiation independent of the rod itself. Their presence between the diode arrays and rod, unlike lasers in which an array abuts the rod, additionally permits defective diodes to be removed and replaced without disturbing either the rod or the alignment of the optical cavity and rod. Thus, although the foregoing is provided for purposes of illustrating, explaining, and describing embodiments of the present invention, modifications and adaptations to these embodiments will be apparent to those skilled in the art and may be made without departing from the scope or spirit of the invention.

What is claimed is:

1. A solid-state laser comprising:
   a. a material having opposed first and second sides and first and second ends and adapted to emit lasing radiation, wherein the first and second sides of the material are convex, the material having an oblong shape;
   b. first and second means spaced along the first and second sides of the material, respectively, for pumping the material by emitting pumping radiation, wherein each of the pumping means spaced along the first and second sides of the material comprises a 1×N array of diodes, where N is an integer greater than one;
   c. a lens having a cylindrical shape interposed optically between the first pumping means and the first side of the material, for at least partially collimating the emitted pump radiation; and
   d. means for redirecting the emitted lasing radiation through the material along at least four paths extending from the first end of the material to the second end, wherein the redirecting means comprises a prism having adjoining first and second faces, at least one of the four paths extending to the first face and another of the four paths extending to the second face, and a truncated prism having a plurality of reflective faces, each of the four paths extending to at least one of which reflective faces.

2. A solid state laser comprising:
   a. a lasing material adapted to emit radiation;
   b. a set of optical components comprising an optical cavity capable of sustaining a $TEM_{00}$ mode of oscillation having a height and width;
   c. means for transversely pumping the lasing material to create a gain region having a height and width;
   d. means, interposed optically between the transverse pumping means and the lasing material, for substantially matching the height of the gain region to the height of the $TEM_{00}$ mode volume; and
   e. means for redirecting the emitted radiation longitudinally through the lasing material and folding the $TEM_{00}$ mode volume to substantially match the width of the gain region.

3. A solid-state laser according to claim 2 in which the transverse pumping means comprises a scalable array of laser diodes.

4. A solid-state laser according to claim 3 in which the gain region is approximately rectangular and lies within an oblong Nd:YAG rod comprising the lasing material.

5. A solid-state laser according to claim 4 in which the redirecting means comprises means for redirecting the emitted radiation through the gain region along four distinct longitudinal paths.

6. A solid-state laser according to claim 5 in which the height-matching means comprises a cylindrical lens.

7. A solid-state laser according to claim 6 in which the lasing material has two opposed elongated sides and the transverse pumping means further comprises a second scalable array of laser diodes, one scalable array associated with each elongated side of the lasing material.

8. A solid-state laser according to claim 7 in which the lasing material has an end and the redirecting means comprises a prism communicating optically with the end of the lasing material and to which the four distinct longitudinal paths extend.

9. A solid-state laser according to claim 2 in which the gain region is approximately rectangular and lies within an oblong Nd:YAG rod comprising the lasing material.

10. A solid-state laser according to claim 2 in which the redirecting means comprises means for redirecting the emitted radiation through the gain region along four distinct longitudinal paths.

11. A solid-state laser according to claim 2 in which the height-matching means comprises a cylindrical lens.

12. A solid-state laser according to claim 2 in which the lasing material has two opposed elongated sides and the transverse pumping means comprises two scalable arrays of laser diodes, one associated with each elongated side of the lasing material.

13. A solid-state laser according to claim 2 in which the lasing material has an end and the redirecting means comprises a prism communicating optically with the end of the lasing material.

14. A solid-state laser according to claim 2 in which the lasing material has an end comprising a face that reflects optical radiation incident at 45°.

15. A solid-state laser comprising:
a. an oblong Nd:YAG rod having first and second ends and elongated first and second sides and defining an approximately rectangular excitation region;
b. a first linear array of series-connected laser diodes positioned alongside but spaced from the first side of the rod;
c. a second linear array of series-connected laser diodes positioned alongside but spaced from the second side of the rod;
d. a first cylindrical lens interposed optically between the first linear array and the first side of the rod;
e. a second cylindrical lens interposed optically between the second linear array and the second side of the rod;
f. means for passing optical radiation longitudinally through the rod along distinct first, second, third, and fourth paths, comprising:
  i. a prism positioned adjacent the first end of the rod and having adjoining first and second reflective faces, the first and second paths extending to the first reflective face and the third and fourth paths extending to the second reflective face;
  ii. a first concave reflector optically communicating with the first reflective face of the prism and to which the first and second paths extend;
  iii. a second concave reflector optically communicating with the second reflective face of the prism and to which the third and fourth paths extend;
  iv. a truncated prism positioned adjacent the second end of the rod and having first, second, and third reflective faces, the first path extending to the first reflective face, the second and third paths extending to the second reflective face, and the fourth path extending to the third reflective face; and
  v. a third concave reflector optically communicating with the third reflective face of the truncated prism and to which the fourth path extends; and
g. an output coupler optically communicating with the first reflective face of the truncated prism and to which the first path extends.

16. A solid-state laser comprising:
a. a lasing material having a gain region having a longitudinal extent and a generally rectangular cross-section transverse the longitudinal extent with a height and width, the gain region being adapted to emit radiation and defining a folded $TEM_{00}$ mode volume having a height and width;
b. means for transversely pumping the gain region;
c. optical means for substantially matching the height of the gain region with the height of the folded $TEM_{00}$ mode volume; and
d. means for redirecting the emitted radiation longitudinally through the gain region and substantially matching the width of the folded $TEM_{00}$ mode volume to the width of the gain region.

* * * * *